(12) United States Patent
Andrew et al.

(10) Patent No.: US 12,450,300 B2
(45) Date of Patent: Oct. 21, 2025

(54) THREADING CHATS WITH APPLICATION ACTIVITY

(71) Applicant: Microsoft Technology Licensing, LLC, Redmond, WA (US)

(72) Inventors: Felix G. T. I. Andrew, Seattle, WA (US); Kjel Benjamin Larsen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/622,628

(22) Filed: Mar. 29, 2024

(65) Prior Publication Data

US 2025/0307326 A1 Oct. 2, 2025

(51) Int. Cl.
*G06F 16/9535* (2019.01)
*G06F 16/954* (2019.01)

(52) U.S. Cl.
CPC ........ *G06F 16/9535* (2019.01); *G06F 16/954* (2019.01)

(58) Field of Classification Search
CPC ............................ G06F 16/9535; G06F 16/954
USPC ........................................................ 707/770
See application file for complete search history.

(56) References Cited

U.S. PATENT DOCUMENTS

| | | | | |
|---|---|---|---|---|
| 6,584,492 B1* | 6/2003 | Cezar | ..................... | G06Q 30/02 709/203 |
| 9,129,036 B2* | 9/2015 | Dexter | ................ | G06F 16/8373 |
| 2002/0198882 A1* | 12/2002 | Linden | ................... | G06F 16/904 |
| 2003/0187925 A1* | 10/2003 | Inala | ....................... | G06F 21/41 709/204 |
| 2007/0016585 A1* | 1/2007 | Nickell | ................. | G06F 16/951 |
| 2008/0288362 A1* | 11/2008 | King | ................. | G06Q 30/0641 705/26.8 |
| 2014/0040225 A1* | 2/2014 | Krit | ....................... | G06F 16/951 707/706 |
| 2019/0034531 A1* | 1/2019 | Bosarge | .................. | G06F 3/017 |

OTHER PUBLICATIONS

Extended European search report received for European Application No. 25165167.5, mailed on Sep. 16, 2025, 08 pages.
Stringer, Levi, "Building Stateful Conversations with Postgres and LLMs", Retrieved from internet URL: https://medium.com/@levi_stringer/building-stateful-conversations-with-postgres-and-llms-e6bb2a5ff73e, Mar. 12, 2024, 17 pages.

* cited by examiner

*Primary Examiner* — Kuen S Lu

(57) ABSTRACT

Examples relate to systems and methods for restoring threads including context of the threads outside of a chat interface. During a thread including multiple queries and responses, one or more of the responses may include links to web pages and/or to other applications (e.g., presentation applications, word-processing applications). During interactions with the thread, one or more of the links may be selected. The selection of the links causes the corresponding web pages to be loaded and/or the corresponding applications to be launched. The web pages that are opened and/or the applications that are launched during an ongoing thread are stored as thread data for the ongoing thread. Then, when the thread is resumed at a later time, not only is the chat interface populated with the prior queries and responses of the thread, but the web pages and/or applications are also restored.

19 Claims, 11 Drawing Sheets

THREADING CHATS WITH APPLICATION ACTIVITY

BACKGROUND

Interactions with generative artificial intelligence (AI) models may often occur in a chat-based format. For instance, natural language inputs are provided to a chat interface. Those natural language inputs are combined into a prompt that is provided to the AI model to process. The output of the AI model is then provided as a response to the natural language inputs. These input/output pairs may continue for several turns as part of a thread or pseudo-conversation with the AI model.

It is with respect to these limitations and other considerations that examples have been made. In addition, although relatively specific problems have been discussed, it should be understood that the examples should not be limited to solving the specific problems identified in the background.

SUMMARY

Examples described in this disclosure relate to systems and methods for restoring threads including context of the threads outside of a chat interface. For instance, during a thread including multiple queries and responses, one or more of the responses may include links to web pages and/or to other applications (e.g., presentation applications, word-processing applications). During interactions with the thread, one or more of the links in the responses may be selected by the user. The selection of the links causes the corresponding web pages to be loaded and/or the corresponding applications to be launched. With the technology described herein, the web pages that are opened and/or the applications that are launched during an ongoing thread are stored as thread data for the particular ongoing thread. For instance, web addresses for the web pages may be stored as web-activity data, and the application identifiers for applications may be stored as application-activity data. Then, when the thread is resumed at a later time (e.g., a day later, a week later), not only is the chat interface populated with the prior queries and responses of the thread, but the web pages and/or applications are restored to provide a more holistic context for the thread outside of the chat interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

As discussed briefly above, interactions with generative AI models may occur through a chat-based interface where the generative AI model supports, or provides, the chatbot functionality. As part of the chat, an input or query is received (often from a user) and a response is generated from an output of the AI model that processes the input. Each input-output pair may be considered a single "turn." Multiple turns form a thread or conversation.

Different threads or conversations may be stored so that a user can resume the particular conversation from where they left off. Merely resuming the particular conversation, however, may result in an incomplete context from where the user actually left off in the conversation. For instance, during the conversation, the responses may recommend that a particular website be visited or that a particular application be launched. The user may then select the link to the website and/or select a link to launch the recommended application. The conversation may then continue with the opened links and/or applications. Accordingly, the holistic experience for the user includes not only the queries and responses of the conversation but also the resulting web pages and applications that resulted from the user interactions with responses. As a result, simply resuming the conversation at a later point in time does not provide the same experience because the web pages and/or applications that were opened are no longer available.

The technology disclosed herein, among other things, alleviates this issue by storing data relating to web and/or application activity that resulted from the particular conversation. Then, when the conversation is resumed at a later time, the web and/or application activity is restored along with resuming the conversation. As an example, during a conversation, a series of web pages are opened in different tabs of a web browser as a result of a user selecting links provided in responses in the conversation. Those selected links are then stored with the thread of the chat and are reopened upon a subsequent selection to resume the thread. The tabs corresponding to the selected web pages may also be stored as tab group associated with the particular conversation from which they were selected. As another example, a chat response may recommend that an application be launched (e.g., a presentation application) or that a slide be inserted into a presentation. If an interaction occurs that launches the application and/or inserts the slide, that interaction may be stored with the thread for the chat. Then, when the conversation is later resumed, the application is re-launched and/or the corresponding presentation is loaded and navigated to the inserted slide. Thus, restoration of a conversation results in not only the queries and responses being loaded, but also a holistic experience of the user that resulted from the conversation.

Figure 1:
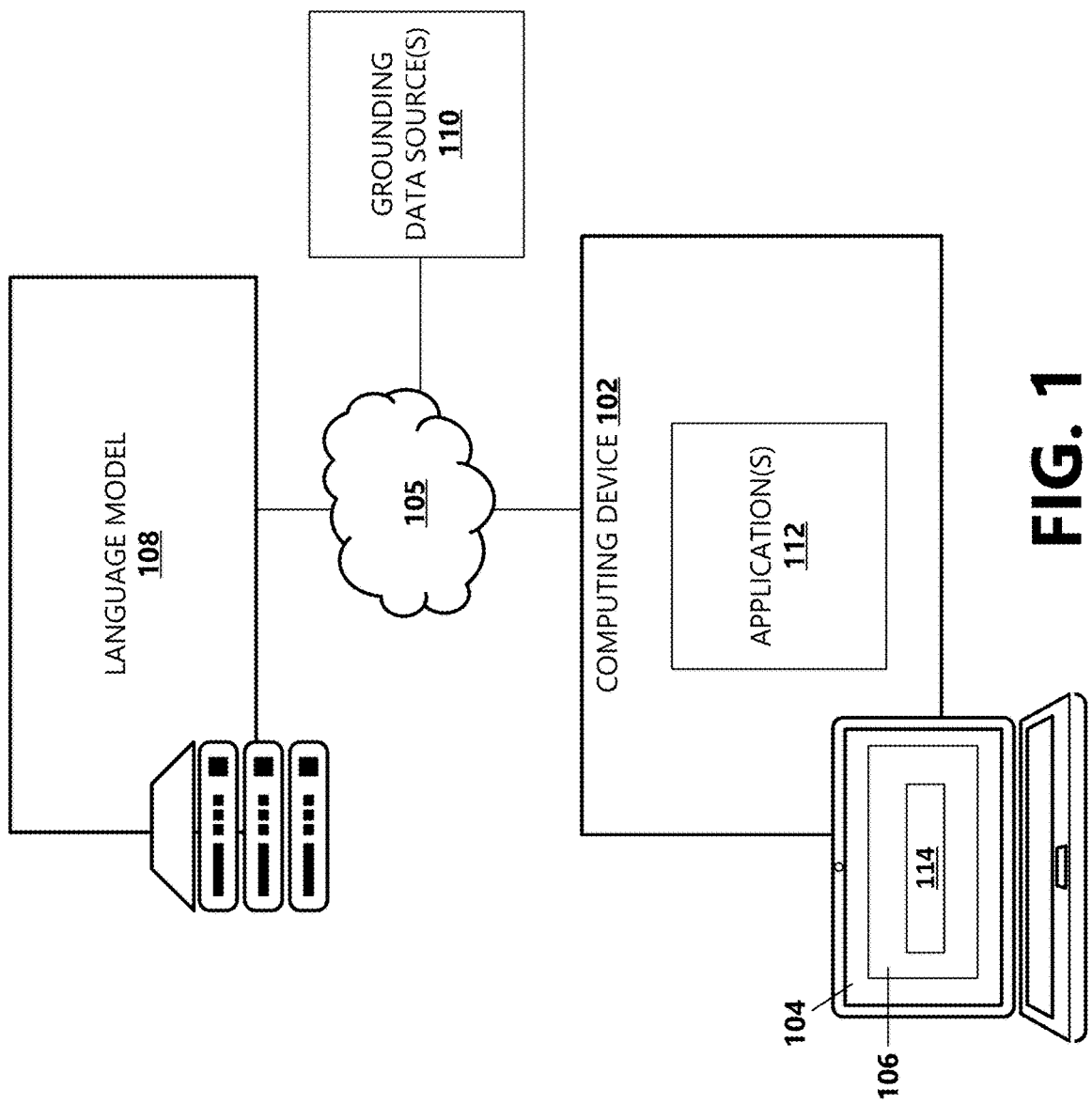
FIG. 1 is a block diagram of a system in which examples of the disclosed technology may be implemented.
Figure 5:
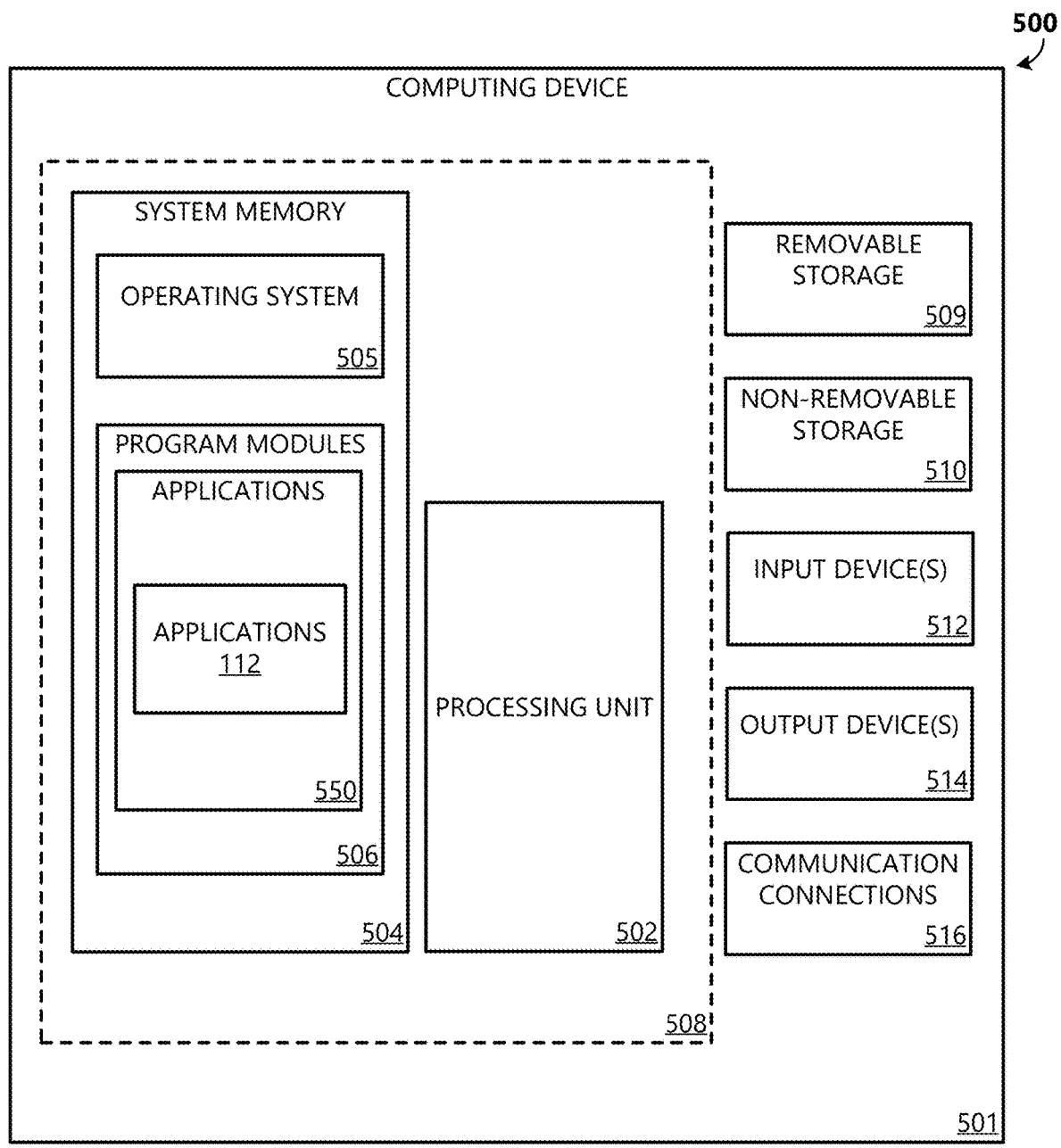
FIG. 5 is a block diagram illustrating example physical components of a computing device with which aspects of the disclosure may be practiced.

FIG. 1 is a block diagram of an example system 100 for generating a prompt in accordance with an example. The example system 100, as depicted, is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 5. In another example, the components of systems disclosed herein are distributed across multiple processing devices. For instance, an input may be entered on a user device or client device and information may be processed on or accessed from other devices in a network, such as one or more remote cloud devices or web server devices.

The example system includes a computing device 102. The computing device 102 may take a variety of forms, including, for example, desktop computers, laptops, tablets, smart phones, wearable devices, gaming devices/platforms, virtualized reality devices/platforms (e.g., virtual reality (VR), augmented reality (AR), mixed reality (MR)), etc. The computing device 102 has an operating system that provides a graphical user interface (GUI) that allows users to interact with the computing device 102 via graphical elements, such as application windows (e.g., display areas), buttons, icons, and the like. For example, the graphical elements are displayed on a display screen 104 of the computing device 102 and can be selected and manipulated via user inputs received via a variety of input device types (e.g., keyboard, mouse, stylus, touch, spoken commands, gesture).

The computing device 102 includes a display 104 that generates a UI 106 according to an application 112 operating on the computing device. The UI 106 may include at least one input field 114 for receiving input from the user.

In examples, the computing device 102 includes a plurality of applications 112 for performing different tasks, such as communicating, information generation and/or management, data manipulation, visual construction, resource coordination, calculations, etc. According to an example implementation, the applications include at least one web browser. In examples, the web browser supports a chat feature that allows a user to interact with a chatbot, such as the BING CHAT interface or the COPILOT interface from Microsoft, through a chat agent interface. The chatbot may interact with a user through various communication means such as text or voice. An input field 114 of the chat interface is presented via the UI 106. The input field receives inputs for the chat feature, as discussed further below. The inputs may be received in the form of various modalities, such as text, image, and/or audio. In examples, the applications 112 include a web browser. The web browser provides interfaces for searching for or accessing web pages, images, news, videos, and other types of content through web addresses (e.g., uniform resource locators). The applications 112 may also include productivity applications, such as word processing applications, presentation applications, spreadsheet applications, and the like.

The computing device 102 is in communication with a language model 108 and one or more grounding data sources 110. The computing device 102 communicates with the language model 108 and grounding data sources 110 via a network 105. For instance, the computing device 102 may communicate with the language model 108 and grounding data sources 110 using one or a combination of networks 105 (e.g., a private area network (PAN), a local area network (LAN), a wide area network (WAN)). In some examples, the language model 108 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

According to example implementations, the language model 108 is trained to understand and generate sequences of tokens, which may be in the form of natural language (e.g., human-like text). In various examples, the language model 108 can understand complex intent, cause and effect, perform language translation, semantic search classification, complex classification, text sentiment, summarization, summarization for an audience, and/or other natural language capabilities.

In some examples, the language model 108 is in the form of a deep neural network that utilizes a transformer architecture to process the text it receives as an input or query. The neural network may include an input layer, multiple hidden layers, and an output layer. The hidden layers typically include attention mechanisms that allow the language model 108 to focus on specific parts of an input, and to generate context-aware outputs. Language model 108 is generally trained using supervised learning based on large amounts of annotated text data and learns to predict the next word or the label of a given text sequence.

The size of a language model 108 may be measured by the number of parameters it has. For instance, as one example of an LLM, the GPT-4 model from OpenAI has billions of parameters. These parameters may be weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. The language model 108 in examples herein, however, is pre-trained, meaning that the language model 108 has already been trained on the large amount of data. This pre-training allows the model to have a strong understanding of the structure and meaning of an input, which makes it more effective for the specific tasks discussed herein.

The language model 108 may operate as a transformer-type neural network. Such an architecture may employ an encoder-decoder structure and self-attenuation mechanisms to process the input (e.g., the query, response to the query or contextual history). Initial processing of the input data may include tokenizing the input into tokens that may then be mapped to a unique integer or mathematical representation. The integers or mathematical representations combined into vectors that may have a fixed size. These vectors may also be known as embeddings.

The initial layer of the transformer model receives the token embeddings. Each of the subsequent layers in the model may use a self-attention mechanism that allows the model to weigh the importance of each token in relation to every other token in the input. In other words, the self-attention mechanism may compute a score for each token pair, which signifies how much attention should be given to other tokens when encoding a particular token. These scores are then used to create a weighted combination of the input embeddings.

In some examples, each layer of the transformer model comprises two primary sub-layers: the self-attention sub-layer and a feed-forward neural network sub-layer. The self-attention mechanism mentioned above is applied first, followed by the feed-forward neural network. The feed-forward neural network may be the same for each position and apply a simple neural network to each of the attention output vectors. The output of one layer becomes the input to the next. This means that each layer incrementally builds upon the understanding and processing of the data made by the previous layers. The output of the final layer may be processed and passed through a linear layer and a softmax activation function. This outputs a probability distribution over all possible tokens in the model's vocabulary. The token(s) with the highest probability is selected as the output token(s) for the corresponding input token(s).

While the generative AI model is generally described as being a "language model," the language model may be capable of handling other and/or multiple modalities. For example, the model may be capable of handling images, video, audio, text, gesture, and/or other types of input.

According to examples, the system 100 includes one or more grounding data sources 110. The grounding data sources 110 may be considered, in some examples, as back-end tools that generate additional information or data that is used by the language model 108 to generate the responses to the queries. For instance, upon processing the query, the language model 108 may generate a secondary query (e.g., grounding query) that is executed against one or more grounding data sources. As an example, the grounding query is a web search to find web pages that are be used to generate the response to the query. In such examples, the grounding data sources 110 include the Internet. In other examples, the grounding data sources 110 include file storage systems, image storage systems, or other types of storage systems that are capable of providing grounding data for generating the response. As another example, the grounding data sources 110 include tools that recommend applications to be launched and/or generate content that is specific to a particular type of application (e.g., a slide for a presentation application). In response to the grounding query generated from the language model 108, the grounding data sources 110 provide the corresponding grounding data. The generated grounding data and the query may then be incorporated into a prompt that is provided to the language model 108 for processing and generating the response based on the grounding data and the initial query from the user. In some examples, the grounding data sources 110 are hosted on different or separate devices and are accessible over the network 105 via application programming interfaces (API).

Figure 2:
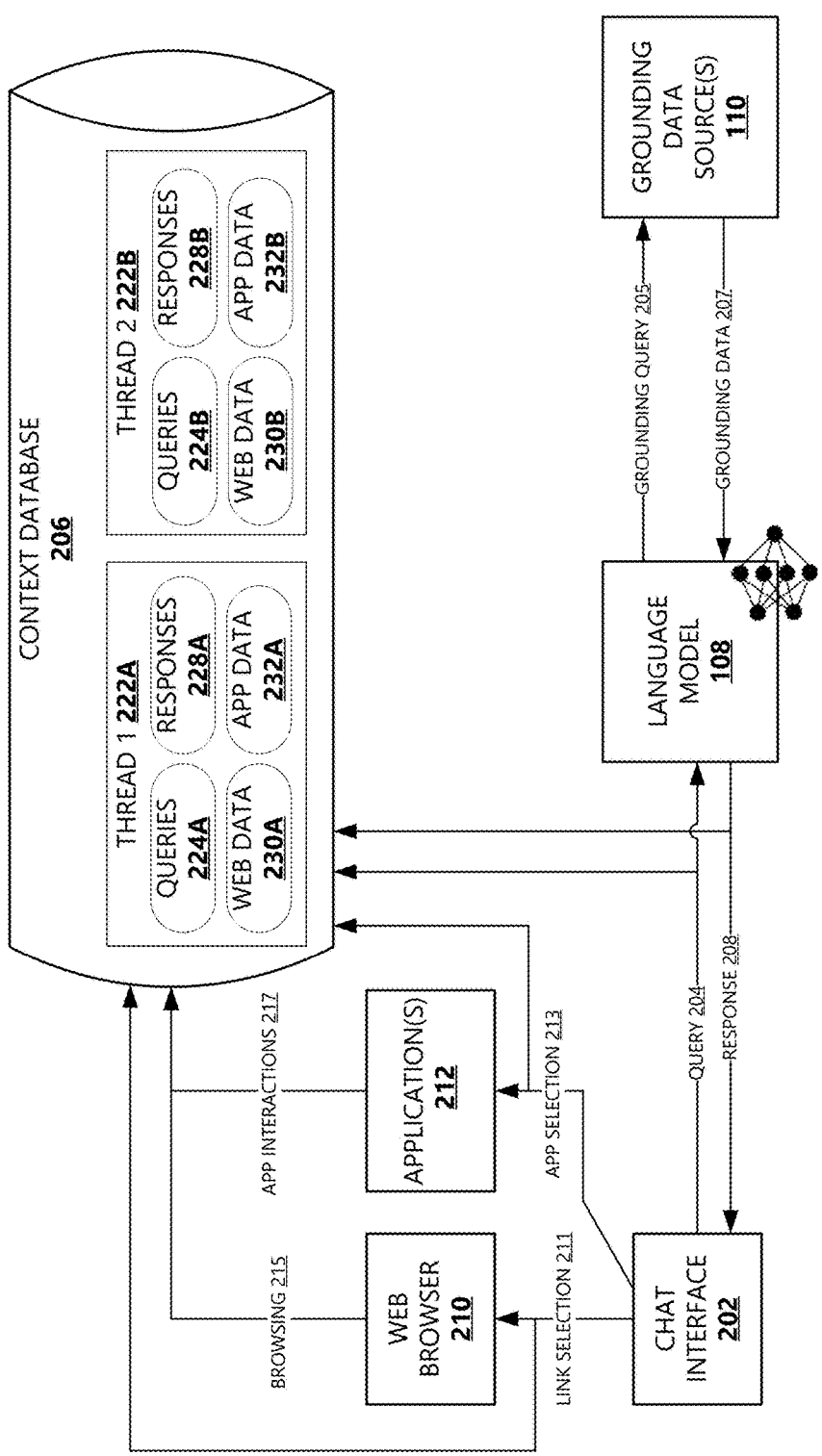
FIG. 2 is a block diagram of example components of a system for threading chats with application activity.

FIG. 2 is a block diagram of example components of an example system 200 for threading chats with application activity. System 200 includes the language model 108 and the grounding data sources 110. The system 200 further includes a chat interface 202, a web browser 210, one or more applications 212, and a context database 206 that stores data associated with different threads.

A thread is started when a query 204 is received through the chat interface 202. The query 204 is an input intended for the chat session. A thread is a collection of content that preserves the context for a particular chat conversation. A turn is a unit of conversation between two participants such as a human and a chatbot. In a conversational system, a turn is initiated by one participant and ends when the other participant responds. For example, a turn is initiated when a user enters the query 204 through the chat interface 202. The turn ends when a response 208 is generated at language model 108 for the query 204.

The language model 108 receives the query 204 and processes the query 204 to generate response 208 to the input query 204. The process of generating the response 208 from the language model 108 may involve several operations, including incorporating the query 204 into an AI prompt, preprocessing, embedding, encoding, decoding, and postprocessing. As an initial stage, the query 204 is incorporated into a prompt that may include static instructions and other considerations for processing the query 204.

As an example embodiment, during preprocessing, the prompt with the query 204 is cleaned and tokenized into a sequence of words or sub-words. During embedding, each word or sub-word is mapped to a high-dimensional vector representation. During encoding, the vector representations are processed by the model to generate a hidden representation of the input query 204. During decoding, the hidden representation is used to generate the response sequence. Finally, during postprocessing, the response sequence is transformed into a human-readable format and provided back to the chat interface 202 as response 208.

In generating the response 208, the first language model 108 may also facilitate generation and/or retrieval of grounding data for responding to the query 204. For instance, upon processing the query 204, the first language model 108 may generate a secondary query (e.g., grounding query 205) that is executed against one or more grounding data sources 110. For instance, the grounding query 205 may be a web search to find web pages that may be used to generate the response 208 to the query 204. In such examples, the grounding data source 110 includes the Internet. In other examples, the grounding data sources 110 may include file storage systems, image storage systems, or other types of storage systems that are capable of providing grounding data for generating the response 208. As another example, the grounding data sources 110 may include tools that recommend applications to be launched and/or generate content that is specific to a particular type of application (e.g., a slide for a presentation application). In response to the grounding query 205 generated from the first language model 108, the grounding data sources 110 provide the corresponding grounding data 207. In examples, the grounding data 207 includes links to web pages, links or recommendations to launch applications, and/or application-specific content (e.g., a slide for a presentation application, a table for a spreadsheet application). The generated grounding data 207 and the query 204 may then be incorporated into another prompt that is provided to the first language model 108 for processing and generating the response 208 based on the grounding data 207 and the query 204.

Multiple turns may then occur with queries 204 being received and corresponding responses 208 being generated. In addition to surfacing the queries 204 and responses 208, the received queries 204 and generated responses 208 are also stored in a context database 206.

The context database 206 stores data for different threads (e.g., different conversations). For instance, multiple threads may be handled by the systems discussed herein. Each thread may be associated with a unique thread identifier (e.g., unique ID). The context for each thread is stored with the unique ID for the particular thread. As an example, a first thread and a second thread may be associated with a user (e.g., the user started two different chatbot conversations). The context database 206 stores first thread data 222A for the first thread and second thread data 222B for the second thread.

The thread data includes prior queries 224 for the thread, prior responses 228 for the thread, web-activity data 230 for the thread, and application-activity data 232 for the thread. For example, the first thread data 222A includes the prior queries 224A for the first thread, the prior responses 228A for the first thread, web-application activity 230A for the first thread, and application-activity data 232A for the first thread. The second thread data 222A includes prior queries 224B for the second thread, prior responses 228B for the second thread, web-activity data 232B for the second thread, and application-activity data 232B for the second thread. The web-activity data 230 and the application-activity data 232 are discussed in further detail below.

When the responses 208 are surfaced in the chat interface 202, interactions with the responses 208 may be received. For instance, a response 208 may include one or more web links (e.g., URLs) within the response. When one or more of the web links are selected, link-selection indication 211 is provided to the web browser 210, which causes the web browser 210 to open the corresponding links. The link-selection indication 211 may also be provided to the context database 206, where the context database 206 stores the web addresses associated with the selected links as web-activity data 230 for the thread from which the links were selected. In other examples, the link-selection indication 211 may be passed to the context database 206 via the web browser 210. In either case, the thread data 222 includes the web addresses for the links that were selected from the particular thread. For example, if a first link and a second link are selected from a first thread, the web addresses for those links are stored in the first web-activity data 230A of the first thread data 222A.

The web browser 210 may also provide additional data that is stored as web-activity data 230. For example, while a particular thread is active, web pages that are browsed by the user may be transmitted as browsing data 215 and stored as part of the web-activity data 230, even if the browsed web pages did not result directly from selection of a link in a response 208. Continuing with the example above where a user selected a first link (for a first web page) and a second link (for a second web page) from a response 208 in the first thread, a user may then navigate to a third web page and a fourth web page while the chat of the first thread is still ongoing. The web addresses for the third web page and the fourth web page may be provided from the web browser 210 to the context database 206 and also be stored as web-activity data 230A for the first thread. The web addresses associated with the browsing data 215 may be stored separately from the web addresses associated with the link-selection indication 211. For instance, the web addresses associated with the browsing data 215 may be stored in a manner that they can be separately identified from the web addresses associated with the link-selection indication 211.

Another interaction that may occur with a response 208 is a selection of a link to launch an application indicated in the response 208. When an application link is selected, an application-selection indication 213 is transmitted either to an operating system of the device displaying the chat interface 202 and/or to a specific application 212, which causes the application 212 corresponding to the selected link to launch. The application-selection indication 213 may also be provided to the context database 206, where the context database 206 stores the application identifiers associated with the selected application links as application-activity data 232. In other examples, the application-selection indication 213 may be passed to the context database 206 via the application 212. In either case, the thread data 22 includes the application identifiers for the application links that were selected for the particular thread. For example, if an application link is selected from the first thread, the application identifiers for that application link are stored in the application-activity data 232A of the first thread data 222A.

In some examples, the application link in the response also includes additional data beyond an indication to launch a particular application. For example, the application link may include application-specific data that is to be inserted into a particular application. In such examples, an indication of the application-specific data may also be included in the application-selection indication 213 and stored in the application-activity data 232.

The applications 212 may also provide additional data that is stored as application-activity data 232. For example, while a particular thread is active (e.g., the chat is still ongoing), indications of applications 212 that are opened and/or interactions with open applications 212 may be transmitted as application-interaction data 217 and stored as part of the application-activity data 232, even if the applications were opened not as a result from a direct interaction with a response 208 of the thread. Accordingly, the whole experience of the user during the thread, including which applications were open, may be stored in the application-activity data 232.

The particular thread may then become inactive or otherwise end (e.g., user closes the chat interface, a timeout period occurs). A subsequent point in time, however, the user may desire to resume the thread. For example, a user may interact with the first thread and then desire to resume the first thread a week after the last interaction with the thread. When the user selects the first thread again, the thread is resumed and the context of the thread is also resumed. For example, the web addresses stored in the first web-activity data 230 are transmitted to the web browser 210 to cause the web browser 210 to load the corresponding web pages. In addition, the application indicators in the first application-activity data 232A are used to cause the corresponding applications to launch (if not already open) and/or navigate to a particular file or segment of the file indicated in the application-activity data 232A. Further interactions with the resumed first thread may then continue to be stored in the first thread data 222.

A series of interactions are now discussed by way of example with reference to FIGS. 3A-3E. The interactions provide an example of how the context data for a thread is generated and how such context data may be used to resume a thread and restore a more holistic experience corresponding to the resumed thread.

Figure 3A:
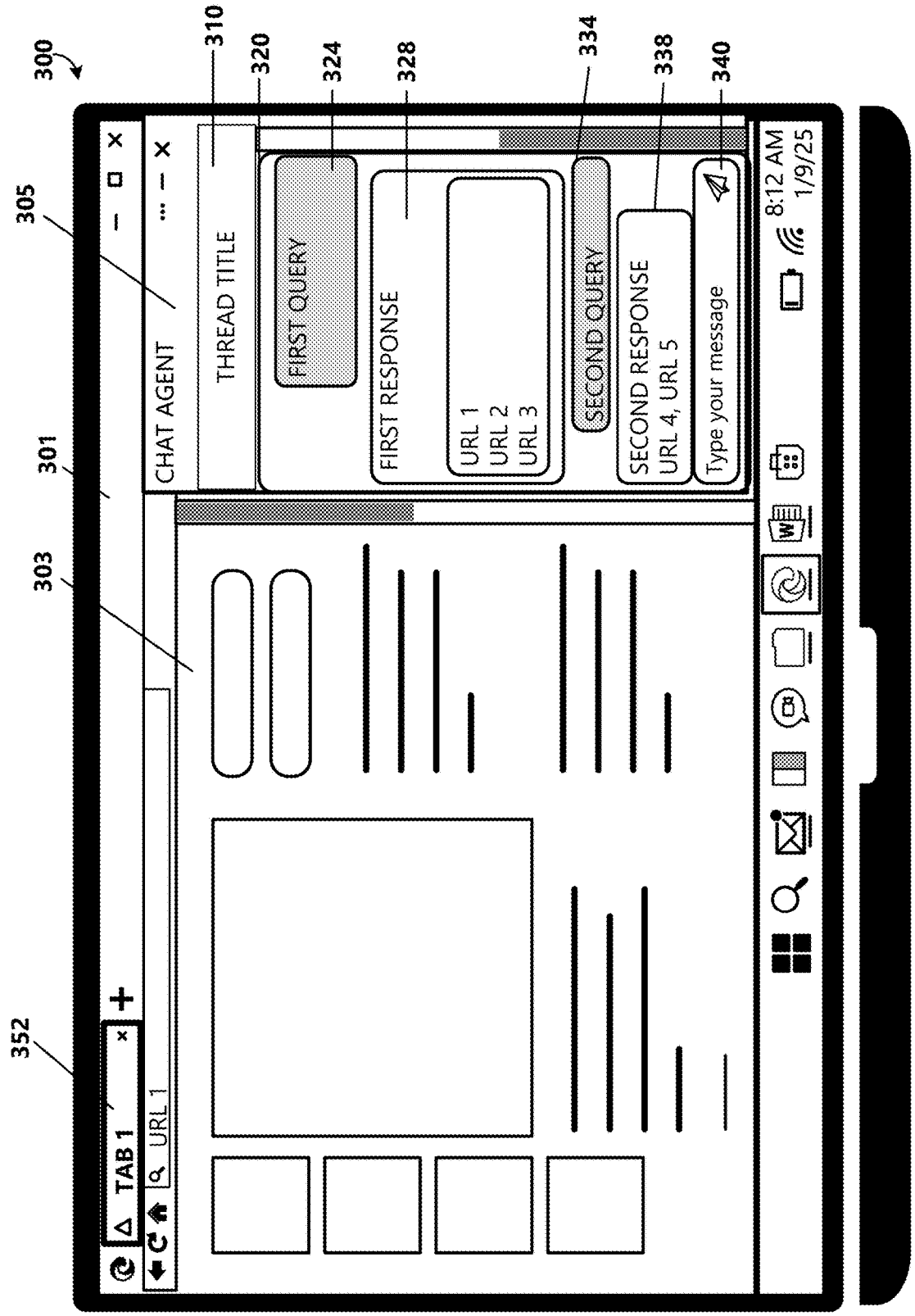
FIGS. 3A-3E depict example interfaces for providing threading functionality.

FIG. 3A depicts an example interface 300 for providing threading functionality. The example interface 300 includes a web browser 301. The web browser 301 includes a main window 303 and a side pane 305. In the example depicted, the side pane 305 that hosts the chat functionality and is controlled by the web browser 301. In other examples, the side pane 305 may be hosted by the operating system of the device and/or another application of the device. In the example depicted, the side pane 305 has been populated with the data from an ongoing thread.

The chat interface in the side pane 305 may include a thread title 310 and a query/response section 320 that displays the prior queries and corresponding generated responses from the language model. For instance, the query/response section 320 includes a first query 324, a first response 328, a second query 334, and a second response 338. A query-input element 340 (e.g., input field) is also presented in the chat interface of the side pane 305 that receives new queries from the user.

The first response 328 includes three web links that correspond to three different URLs (e.g., URL 1, URL 2, and URL 3). The second response 338 includes two additional web links that correspond to two further different URLs (e.g., URL 4, URL 5). In the example depicted, the user has selected the first web link corresponding to URL 1. Selection of the first web link causes the web browser 301 to open the web page associated with URL 1 in a first tab 352 and content associated with the web page is displayed in the main window 303. The selection of the first web link is also transmitted to the context database 206 as a link-selection indication 211 where the context database 206 stores the web address as web-activity data 230 for the current thread.

Figure 3B:
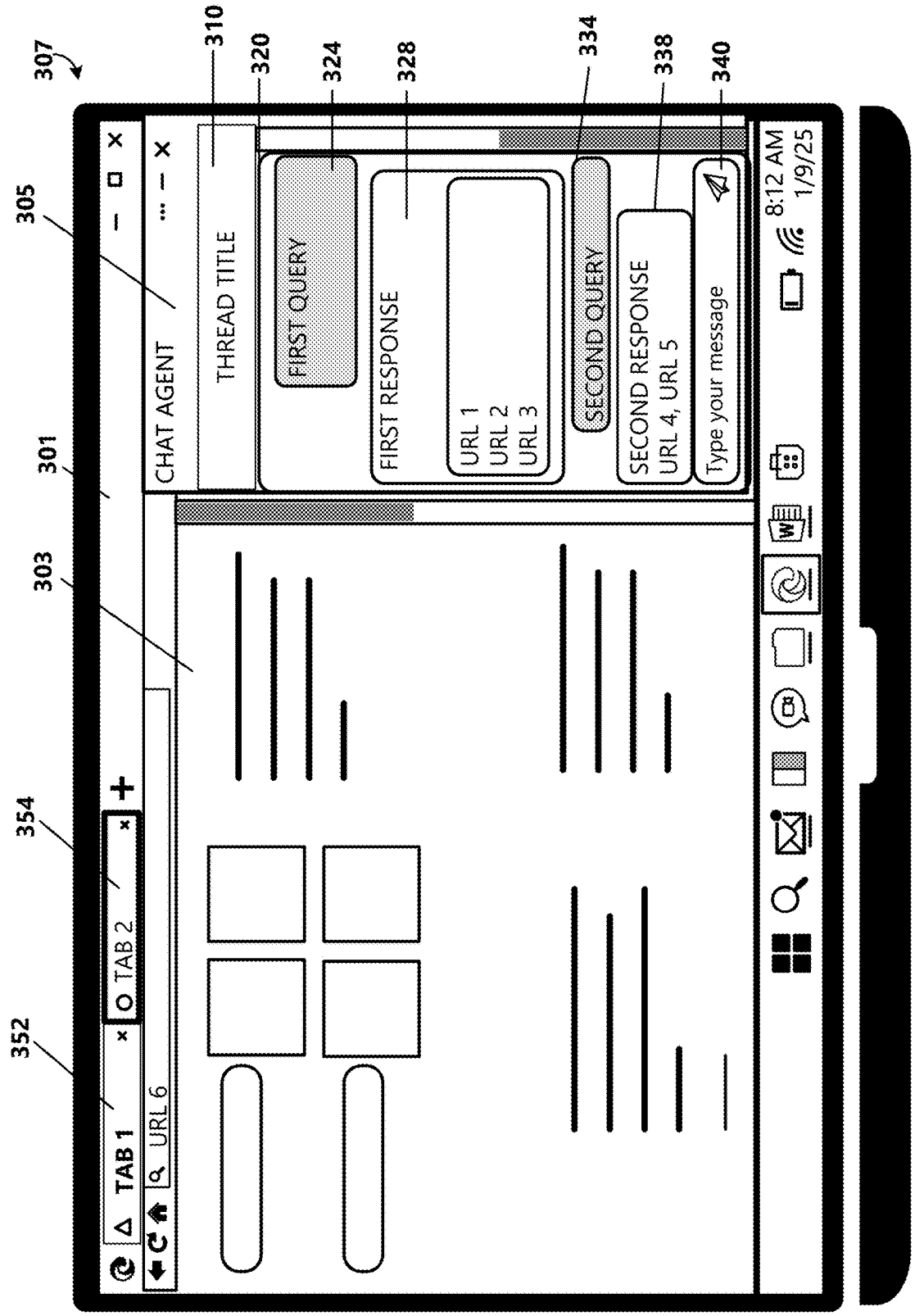

FIG. 3B depicts another example interface 307 for providing threading functionality. The example interface 307 is substantially the same as example interface 300 of FIG. 3A with the exception that a new, second tab 354 has been opened by the user. The new tab has loaded a web page having a URL of URL 6. The opening of the new, second tab 354 resulted from navigation activity that was not a result of selecting one of the links from the chat. Rather, the user may have manually entered the URL 6 or selected a link from outside of the chat. Even in such a situation, because the thread is still ongoing, the URL 6 may be transmitted to the context database 206 to be stored as web-activity data 230 for the current thread. While the URL 6 of the second tab 354 was not navigated to directly from a response of the chat, there is still a high likelihood that the content of the second tab is still relevant to the ongoing thread.

In some examples, a further analysis of the content of the second tab 354 is analyzed before storing the URL 6 as web-activity data 230 to determine if the second tab is likely relevant to the subject matter or topic of the thread. For instance, the content of the web page in the second tab 354 may be compared to the content of the queries and/or responses of the thread to determine whether they are similar and therefore likely related. If they are similar, the URL 6 is added to the web-activity data 230 for the thread. If they are not similar, the URL 6 is not added to the web-activity data 230. In some examples, the user may also be provided with an option as to whether or not the link data should be stored with the thread. Additional discussion of example processes for performing such a comparison is discussed below with respect to FIGS. 4A-4B.

Figure 3C:
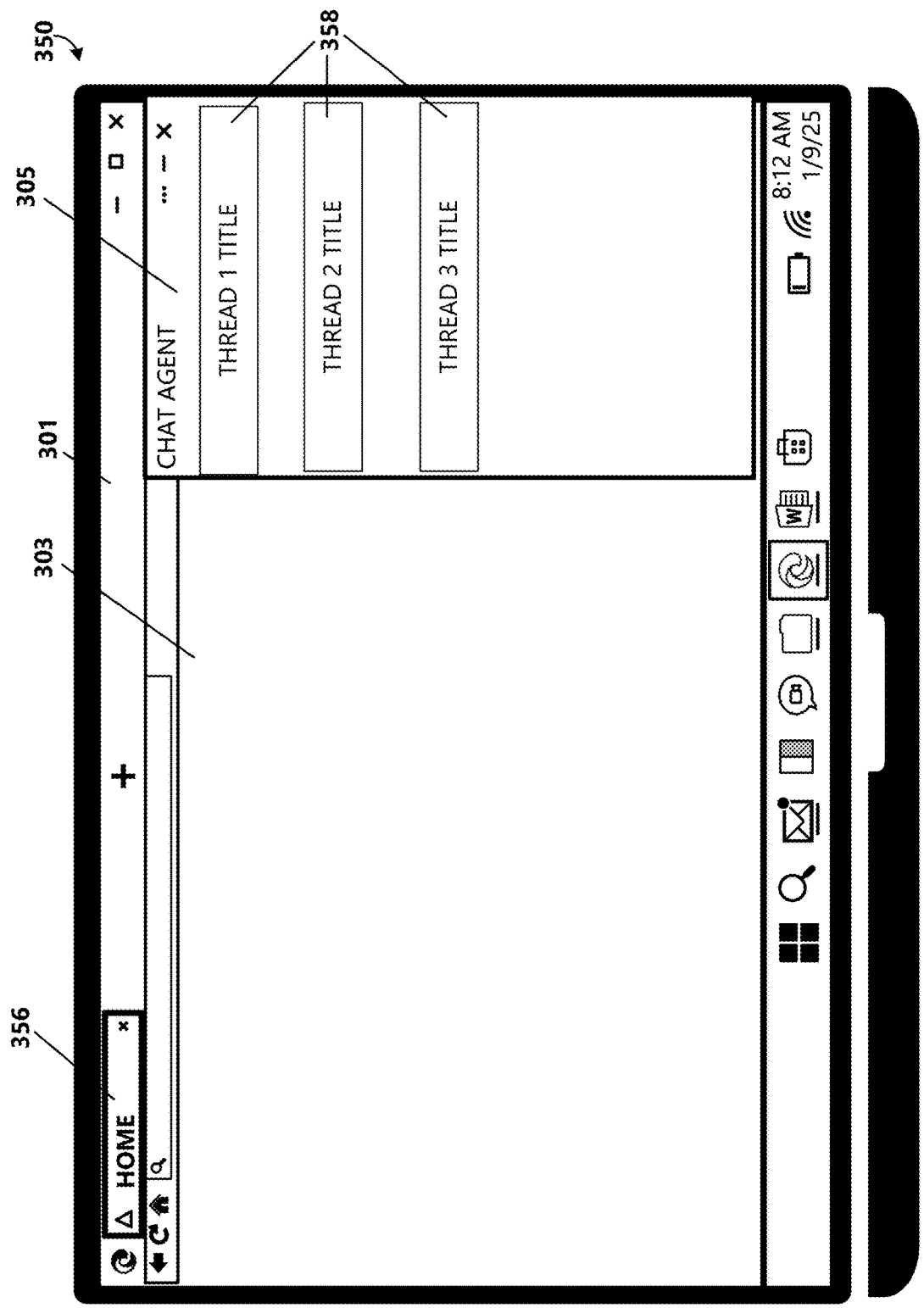

FIG. 3C depicts another example interface 350 for providing threading functionality. The interface 350 includes many of the same elements as interfaces 300-301. In In the depicted example, however, the interface 350 is presented after the thread has concluded and the user is desiring to navigate back to and resume a prior thread. In the example depicted, the web browser has been initially launched with a home-page tab 356 opened and the chat interface has been initiated in the side pane 305.

In the example depicted three selectable thread elements 358 are provided in a chat selection interface of the side pane 305. The selectable thread elements 358 (e.g., selectable UI elements corresponding to different stored threads) are generated for the stored threads associated with the user. The example selectable thread elements 358 include a first thread element for a first stored thread, a second thread element for a second stored thread, and a third thread element for a third stored thread element. When one of the selectable thread elements 358 is selected, the corresponding thread is resumed.

As an example, the thread depicted in FIGS. 3A-3B was the first thread. When the session with the first thread ended (e.g., by closing the side pane or after time out period with no interaction), the first thread data 222A for the first thread was stored in the context database 206. The first selectable thread element 358 is generated for the first thread and surfaced in the chat interface with the other selectable thread elements 358. When the first selectable thread element 358 is selected, the first thread data 222A is accessed from the context database 206 and used to resume the first thread and also restore the holistic context associated with the thread, such as by restoring web pages and launched applications.

Figure 3D:
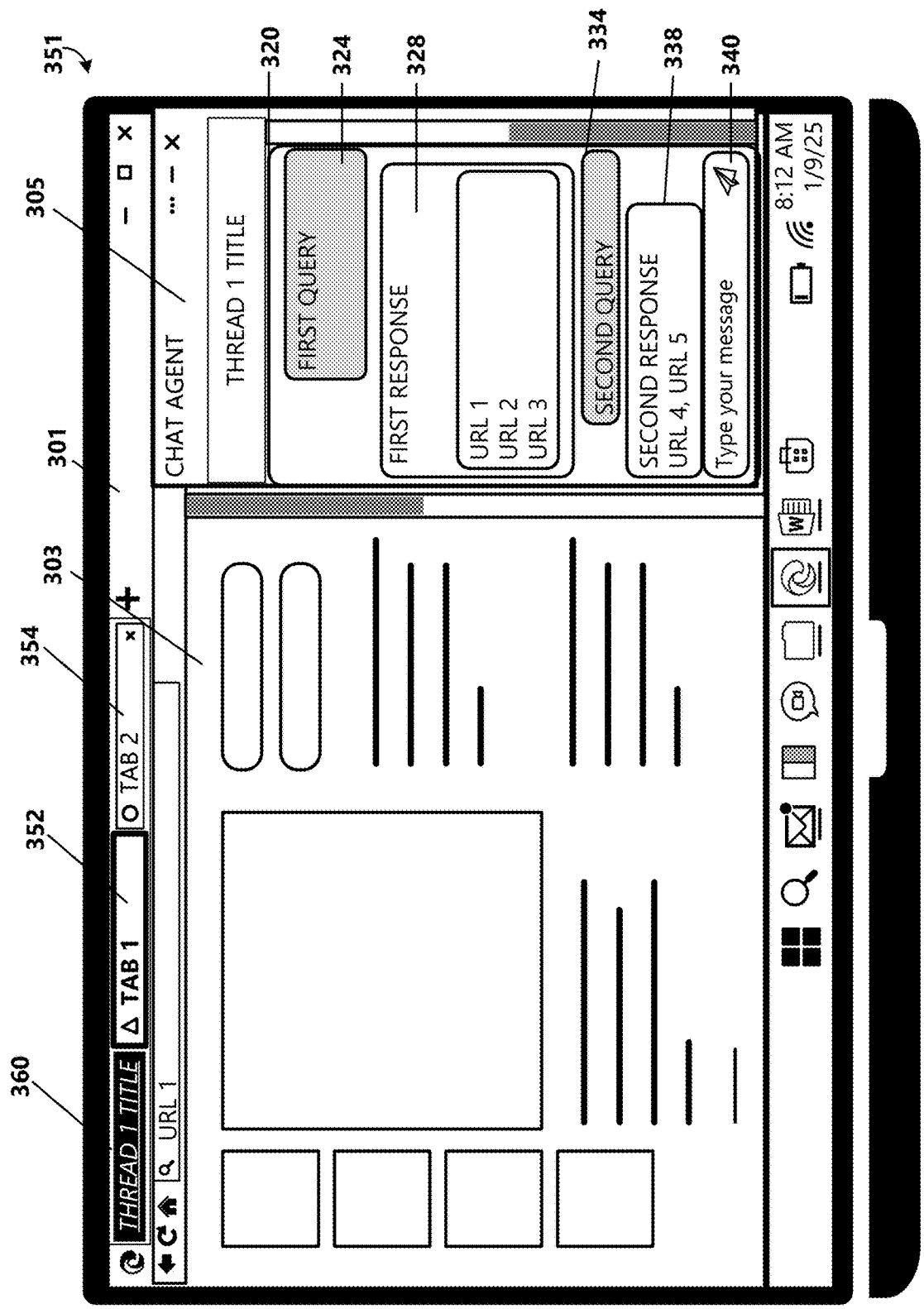

FIG. 3D depicts an example interface 351 after the first selectable thread element 358 has been selected. Based on receiving the selection, the first thread is resumed within the chat interface of the side pane 305. Resuming the thread includes populating the chat interface (e.g., the query/response section 320) with the responses and queries associated with the selected thread. In the current example, the first query 324, the first response 328, the second query 334, and the second response 338 are restored in the chat interface. Resuming the thread also includes restoring the associated context associated with the thread, such as the context indicated in the web-activity data 230 and/or the application-activity data 232 for the thread.

In the current example of restoring the first thread, the first tab 352 and the second tab 354 are restored in the web browser 301. For instance, when the first selectable thread element 358 was selected, the web-activity data 230A of the first thread data 222A for the first thread is provided to the web bowser 301. The web-activity data 230A includes the web addresses for the web pages that were previously associated with the first thread. In this example, the web addresses were URL 1 and the URL 6. Accordingly, the first tab 352 with URL 1 and the second tab 354 with URL 6 are both restored by the web browser 301.

The restored web pages may also be restored as a tab group 360 that is associated with the resumed thread. For instance, the tab group 360 may be named with the title of the resumed thread. In the current example, the first thread has a title of "Thread 1 Title" and the corresponding tab group 360 also has a name of "Thread 1 Title". The tab group 360 is a collection of tabs (and their corresponding URLs/web pages). The tab group 360 may have its own unique identifier such that the tab group 360 can be stored and distinguished from other tab groups.

Figure 3E:
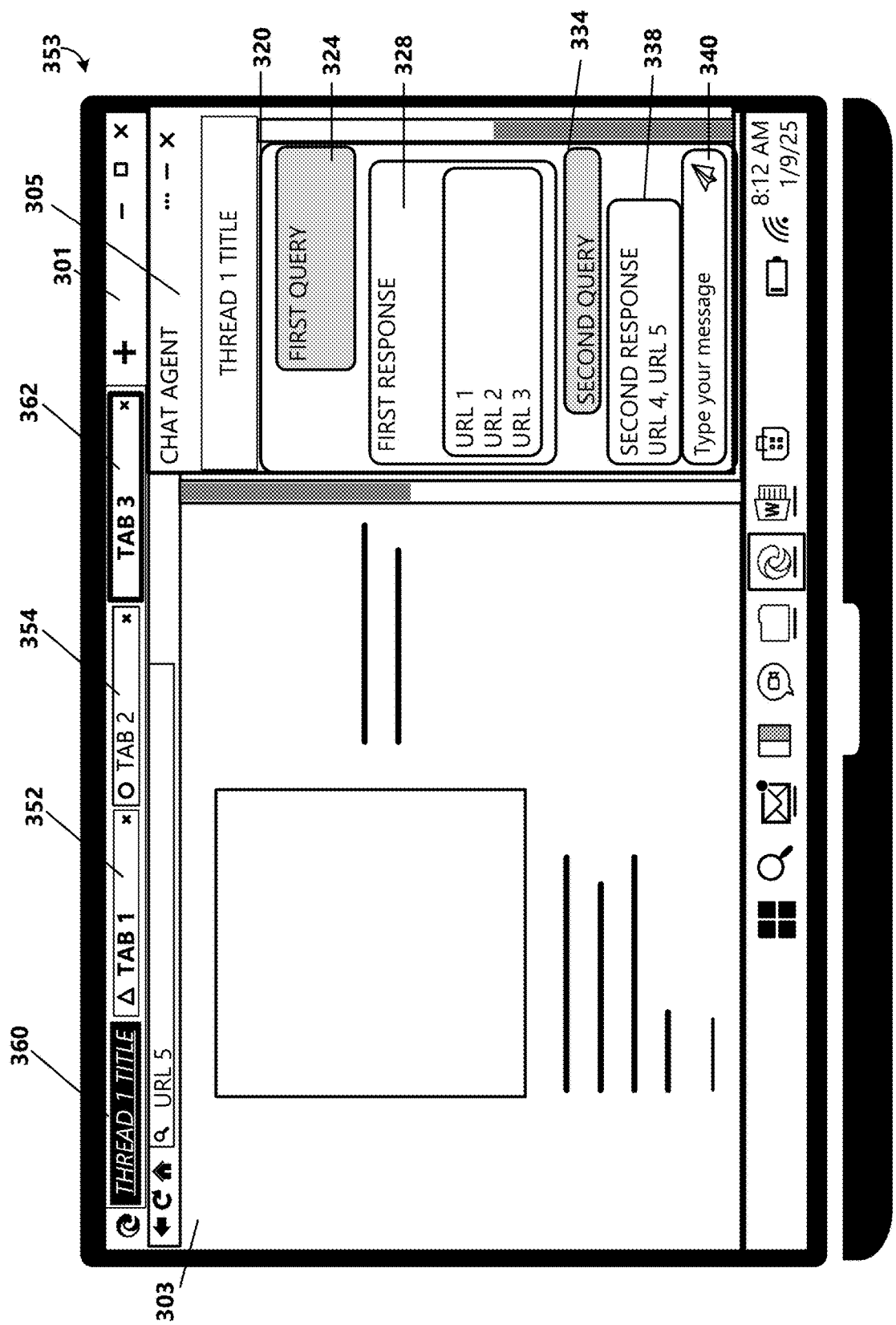

FIG. 3E depicts another interface 353 after a user has selected the URL 5 link in the second response 338. In response to receiving the selection of the URL 5 link, a new, third tab 362 is opened and the web page corresponding to URL 5 is opened in the main window 303. The newly created third tab 362 is also added to the tab group 360 associated with the first thread. The selection of the link to URL 5 is also provided to the context database 206 to be stored in the web-activity data 230A for the first thread. In some examples, the unique ID for the tab group 360 is also provided to the context database 206 to be stored in the web-activity data 230A for the first thread. By storing the unique ID for the tab group 360, future restorations of the first thread may include providing the unique ID for the tab group 360 to the web browser 301 to cause the web browser 301 to restore the tab group 360. As the user updates the tab group 360 (e.g., by adding or removing tabs), the web-activity data may be automatically updated accordingly.

In some examples, a unique ID for the first thread may also be stored by the web browser 301 with the tab group 360. For instance, the web browser 301 may store multiple tab groups that can be restored by a user by selecting a particular tab group from a listing of tab groups. Then, when the tab group 360 is selected, the web browser 301 provides the ID for the first thread to the chat interface to cause the first thread to be resumed within the chat interface. Accordingly, selection of prior thread may cause the restoration of a tab group, and selection of a tab group may cause restoration of the prior thread.

Figure 4A:
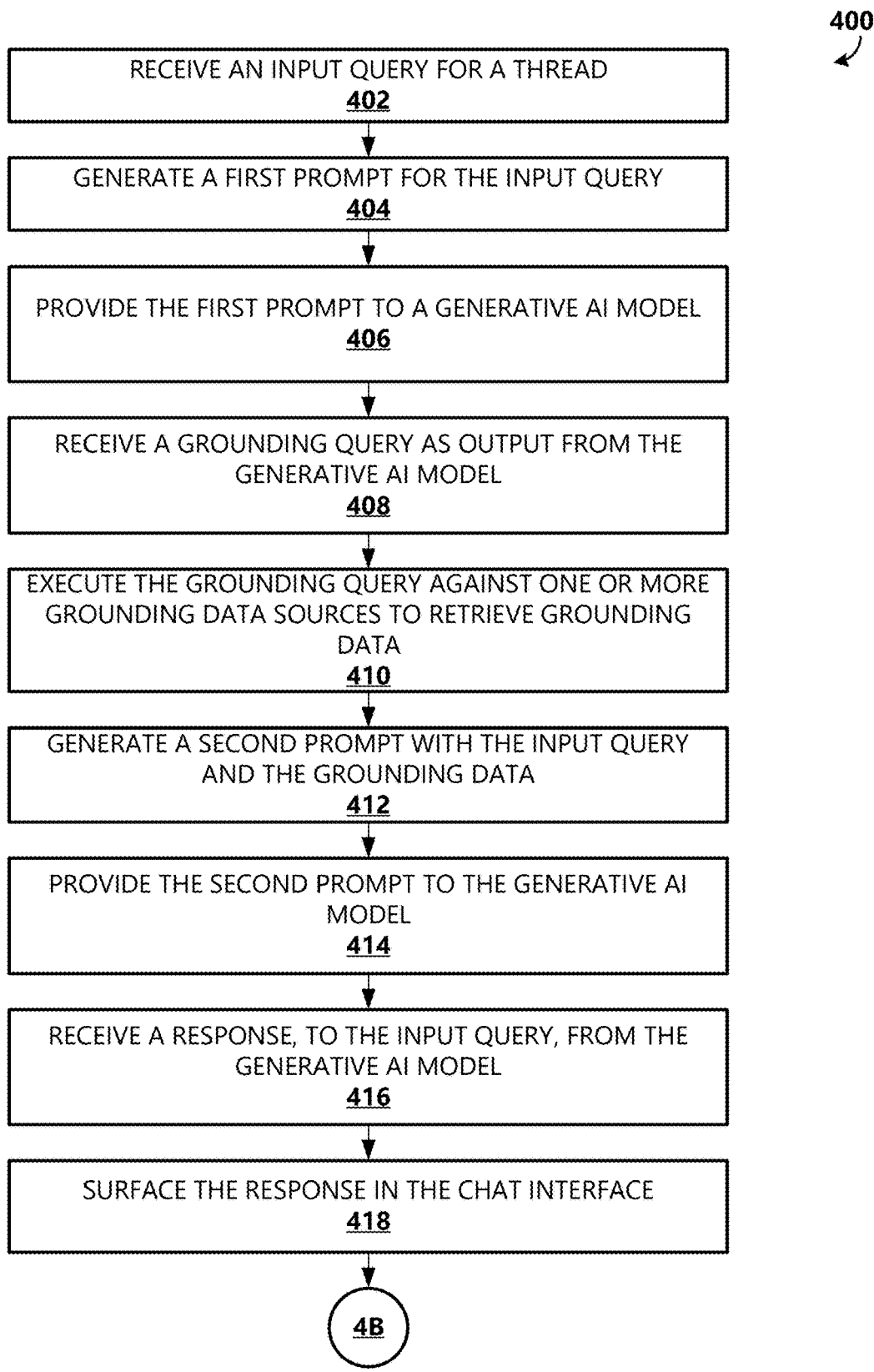
FIGS. 4A-B depict an example method for storing context with a thread.
Figure 4B:
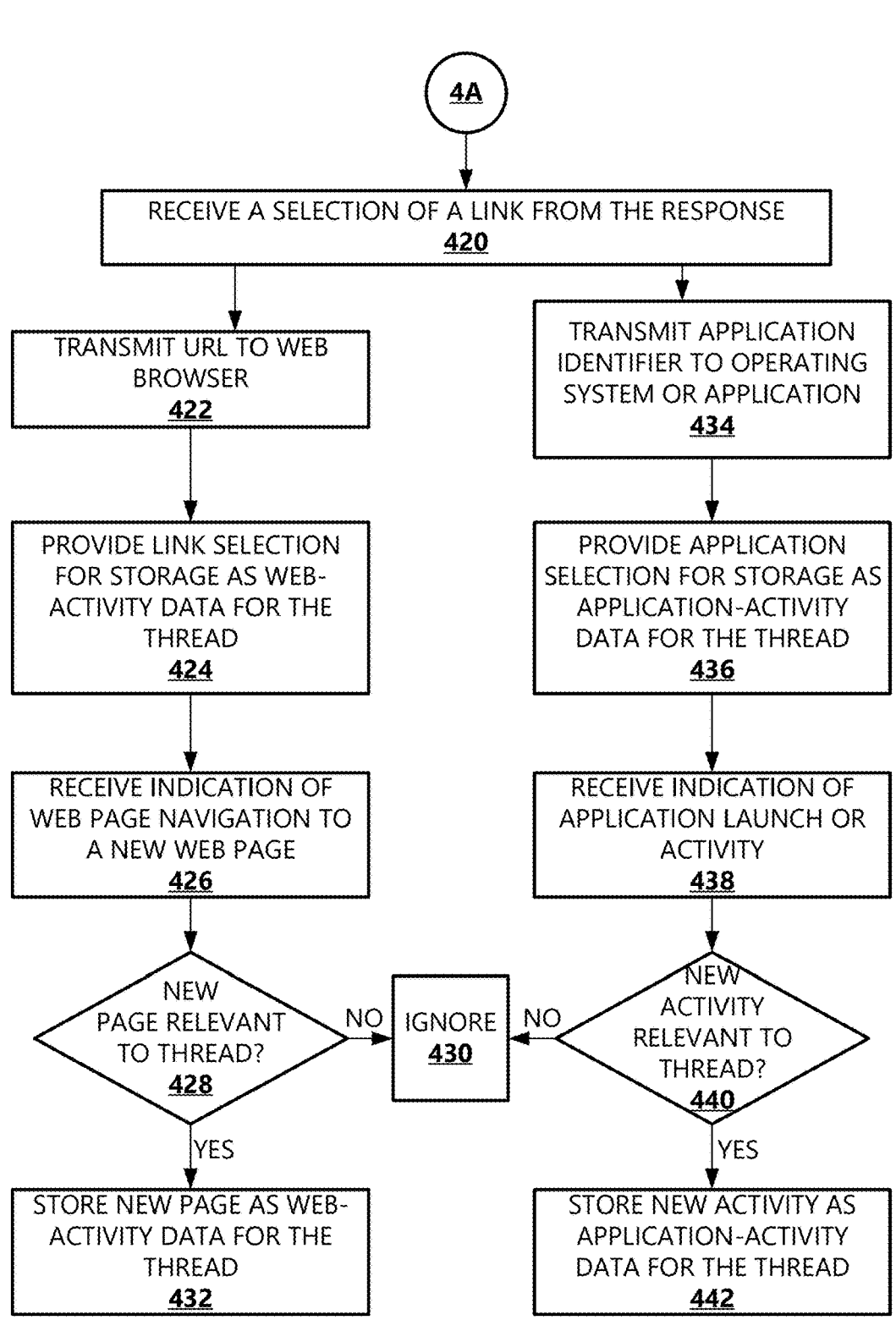

FIGS. 4A-B depict an example method 400 for storing context with a thread. At operation 402, an input query is received for a thread. The input query may be received via an input field of a chat interface, such as a chat interface hosted in a side pane of a web browser. A first AI prompt for the input query is generated at operation 404. The first prompt includes the input query as well as static instructions for how a generative AI model (e.g., a language model) is to process the input query and generate a response.

At operation 406, the first prompt is provided as input to the generative AI model. The generative AI model processes the first prompt and determines that additional grounding data from one or more grounding data sources would be useful in generating a response to the input query. At operation 408, an output from the generative AI model is received that includes a grounding query to be executed against one or more grounding data source (e.g., back-end tools). At operation 410, the grounding query is executed against the one or more grounding data sources to retrieve grounding data for generating the response to the input query. The grounding data may include links to web pages, links to applications, and/or application-specific data as discussed further herein.

At operation 412, a second AI prompt is generated that that includes the input query and the retrieved grounding data. The second AI prompt also includes static instructions for how to process the input query and the retrieved grounding data. At operation 414, the second prompt is provided to the generative AI model. The generative AI model processes the second prompt and generates the response to the input query. The response is received from the generative AI model in operation 416. At operation 418, the response, including one or more links, is surfaced. For instance, the response may be surfaced in the chat interface.

At operation 420, a selection of a link in the response is received. For instance, a user may select the link from the display of the response in the chat interface. If the link is a link to a web page, operations 422-426 may be performed. If the link is a link to an application, operations 434-438 may be performed.

At operation 422, the web address associated with the selected web page link (e.g., the URL) is transmitted to the web browser to cause the web browser to open the corresponding web page. At operation 424, the link selected is stored as web-activity data for the thread, such as in a context database that stored thread data for multiple threads.

In some examples, the web address for the link may be stored as web-activity data only when the link is determined to be useful to the user and/or the thread. The determination of usefulness may be based on the duration that that the web page has been opened. For example, if a link is selected from a response and the corresponding web page is then closed relatively quickly, an inference can be made that the web page was not useful to the user. In such cases, the web page may not be stored in the web-activity data. In contrast, if a link is selected and remains open for a longer period of time, the web page is more likely to have been useful to the user. For instance, if the user leaves the web page open beyond a threshold duration and then returns to the thread to provide additional queries, the web page may be considered useful even if the web page was eventually closed before or after entering the subsequent queries. Such time or duration data may be received from the web browser to allow for the assessment of usefulness. As one example, the web page may be determined to be useful if the amount of time the web page remained (or remains) open exceeds a threshold duration. Similarly, the web page may be determined not to be useful if the amount of time the web page remained open is below the threshold duration. The storage of the corresponding web page data as web-activity data may occur after the threshold duration is passed. In other examples, the corresponding web page data may be initially stored as web-activity data upon selection of the link, and if the threshold duration is not met, the web page may be deleted from the web-activity data.

At operation 426, an indication may be received from a web browser of a user-initiated web page navigation to a new web page. The user-initiated web page navigation did not occur from the selection of a link in the chat interface. For instance, the user-initiated web page navigation may be from a manual entry of a URL and/or selection of a link from a different application or website. The web browser may open the new web page in a new window and/or in a new tab.

At operation 428, a determination is made as to whether the new web page is relevant to the ongoing thread. If the new web page is not relevant to the ongoing thread, the new web page may be ignored at operation 430. If the new web page is relevant to the ongoing thread, the new web page may be stored as web-activity data for the thread at operation 432.

Determining whether the new web page is relevant to the current thread may be performed in a variety of manners. For instance, the content of the web page may be compared to one or more of the queries and/or responses of the ongoing thread to determine a similarity. The comparison may include a comparison of semantic similarity (e.g., by comparing embeddings for the content and embeddings for the queries and/or responses), a comparison of keywords, or other comparison of other similarity metrics.

In other examples, the generative AI model may be leveraged for the determination of similarity. As an example, a relevancy prompt is generated that includes at least a portion of the content of the new web page and one more of the responses and/or queries from the ongoing thread. The similarity prompt further includes static instructions that instruct the generative AI model to determine if the content of the web page is relevant to the ongoing thread. The static instructions may include examples of relevant content and/or a set of factors that should be evaluated in determining relevance. The relevancy prompt is then provided to the generative AI model, which processes the relevancy prompt and generates an output. In some examples, the output is a binary output (e.g., yes/no, 1/0) that directly indicates whether the content is relevant. In other examples, the output indicates a relevancy score that indicates the likelihood of relevancy (e.g., 0-100 with 100 indicating a strong likelihood of relevancy). The relevancy determination of operation 428 is then made based on the output from the generative AI model. For example, when the relevancy score is above a threshold or the binary output indicates relevancy, relevancy may be determined to exist.

Returning to operation 434, in examples where the link is a link to an application, the application identifier associated with the link is transmitted to the operating system and/or application to cause the corresponding application to be launched. At operation 436, the application selection is also provided for storage as application-activity data for the thread. For instance, the application identifier is provided to the context databased for storage in thread data for the current thread.

In some examples, similar to the web addresses discussed above, the application identifier for the link may be stored as application-activity data only when the link is determined to be useful to the user and/or the thread. The determination of usefulness may be based on the duration that that the application has been opened. For example, if a link is selected from a response and the corresponding application is then closed relatively quickly, an inference can be made that the application was not useful to the user. In such cases, the application may not be stored in the application-activity data. In contrast, if a link is selected and the application remains open for a longer period of time, the application is more likely to have been useful to the user. For instance, if the user leaves the application open beyond a threshold duration and then returns to the thread to provide additional queries, the application may be considered useful even if the application was eventually closed before or after entering the subsequent queries. Such time or duration data may be received from the application and/or operating system to allow for the assessment of usefulness. As one example, the application may be determined to be useful if the amount of time the application remained (or remains) open exceeds a threshold duration. Similarly, the application may be determined not to be useful if the amount of time the application remained open is below the threshold duration. The storage of the corresponding application identifier as application-activity data may occur after the threshold duration is passed. In other examples, the corresponding application identifier may be initially stored as application-activity data upon selection of the link, and if the threshold duration is not met, the application may be deleted from the application-activity data.

At operation 438, an indication of a user-initiated launch of a second application having a second application identifier is received. The user-initiated launch did not occur as a result of a link being selected from within a response in the thread. For instance, the user may launch the application in another manner, such as via a selection of a shortcut to the application.

At operation 440, a determination is made as to whether the new application activity (e.g., the launch of the second application) is relevant to the ongoing thread. If the new application activity is not relevant to the ongoing thread, the new application activity may be ignored at operation 430. If the new application activity is relevant to the ongoing thread, the application identifier for the newly launched application may be stored as application-activity data for the thread at operation 442.

Determining whether the new application activity is relevant to the current thread may be performed in a variety of manners. For instance, the content of the second application (e.g., content displayed within the new application) may be compared to one or more of the queries and/or responses of the ongoing thread to determine a similarity. The comparison may include a comparison of semantic similarity (e.g., by comparing embeddings for the content and embeddings for the queries and/or responses), a comparison of keywords, or other comparison of other similarity metrics.

In other examples, the generative AI model may be leveraged for the determination of similarity. As an example, a relevancy prompt is generated that includes at least a portion of the content of the second application and one more of the responses and/or queries from the ongoing thread. The similarity prompt further includes static instructions that instruct the generative AI model to determine if the content is relevant to the ongoing thread. The static instructions may include examples of relevant content and/or a set of factors that should be evaluated in determining relevance. The relevancy prompt is then provided to the generative AI model, which processes the relevancy prompt and generates an output. In some examples, the output is a binary output (e.g., yes/no, 1/0) that directly indicates whether the content is relevant. In other examples, the output indicates a relevancy score that indicates the likelihood of relevancy (e.g., 0-100 with 100 indicating a strong likelihood of relevancy). The relevancy determination of operation 440 is then made based on the output from the generative AI model. For example, when the relevancy score is above a threshold or the binary output indicates relevancy, relevancy may be determined to exist.

Figure 4C:
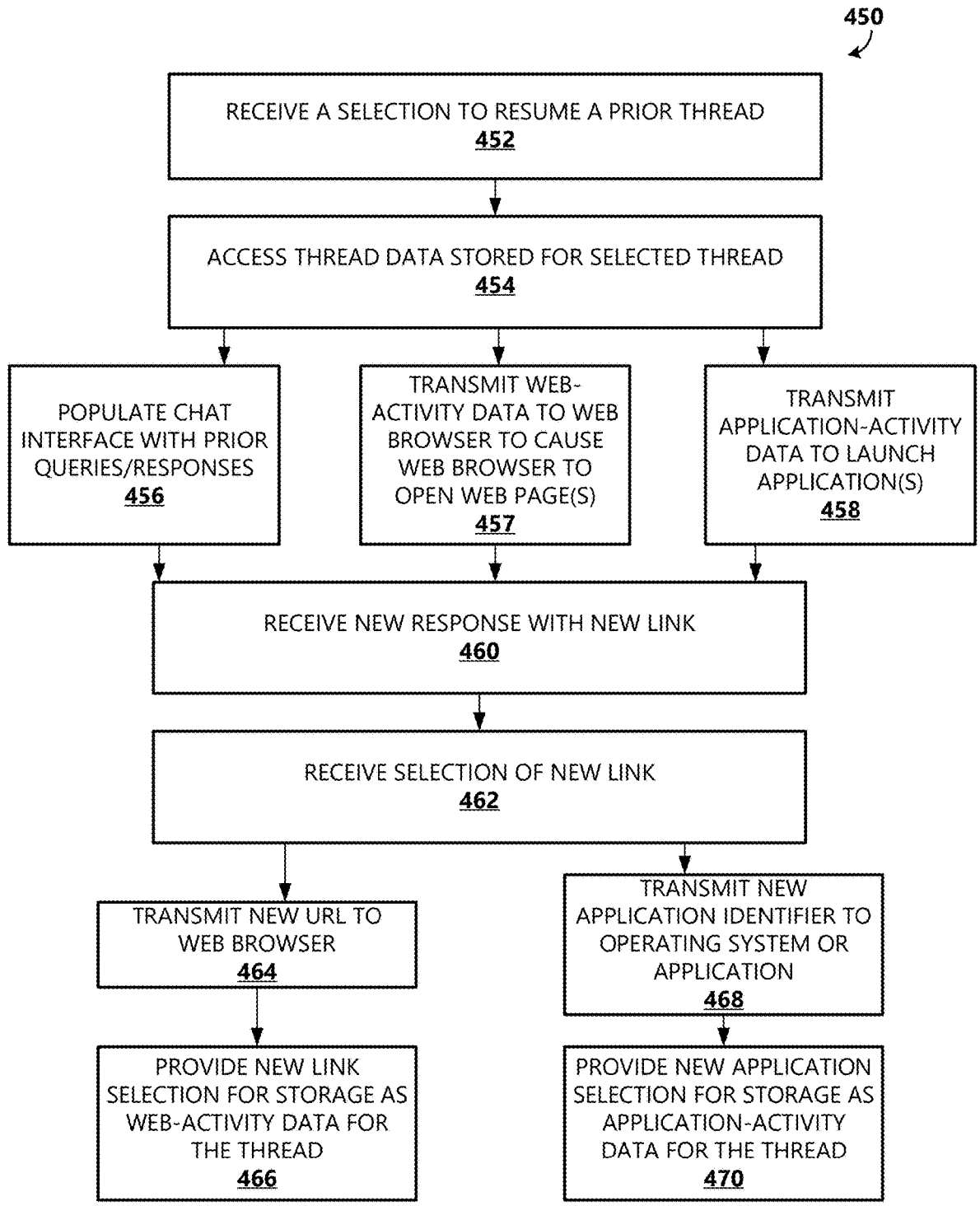
FIG. 4C depicts an example method for restoring a thread.

FIG. 4C depicts an example method 450 for restoring a thread. At operation 452, a selection is received to a resume a prior thread. The selection may be of a selectable thread element for a particular prior thread, such as thread elements 358 in FIG. 3C. In response to receiving the selection to resume the prior thread, the thread data that was previously stored for the prior thread is accessed at operation 545. For instance, the prior queries, the prior responses, the web-activity data, and/or the application-activity data from the context database are be accessed.

At operation 456, the accessed prior queries and responses are populated in the chat interface to resume the previous state of the chat. At operation 457, the web-activity data is transmitted to a web browser to restore the relevant web context of the thread. For instance, the web addresses stored in the web-activity data are provided to the web browser to cause the web browser to open the associated web pages. The web pages may be opened in a tab group that shares a common title as the thread. At operation 458, the application-activity data is transmitted (e.g., to the operating system) to cause the launch of one or applications indicated in the application-activity data. For instance, the application identifier(s) stored in the application-activity data for the thread are used to launch the corresponding application(s).

At operation 460, a new response is received for a new query. The new response includes a new link. A selection of the new link is received in operation 462. If the link is a link to a web page, operations 464-466 are performed. If the link is to an application, operations 468-470 are performed.

At operation 464, the new URL associated with selected link is transmitted to the web browser to cause the web browser to open the corresponding web page. At operation 466, the new link selection is also provided for storage as web-activity data for the thread. For instance, the web address associated with the link is stored as web-activity data for the thread.

At operation 468, the new application identifier from the new link is transmitted to the operating system or application to cause the new application corresponding to the new application identifier to be launched. At operation 470, the new application selected is provided for stage as application-activity data for the thread. For example, the new application identifier is stored as application-activity data for the thread.

While the techniques and procedures in methods depicted in FIGS. 4A-C are depicted and/or described in a certain order for purposes of illustration, it should be appreciated that certain procedures may be reordered and/or omitted within the scope of various embodiments. The operations of the method described therein may also be performed by one or more components of systems 100 or 200 described above among other types of computing devices.

FIG. 5 is a block diagram illustrating physical components (e.g., hardware) of a computing device 501 with which examples of the present disclosure may be practiced. The computing device components described below may be suitable for one or more of the components of the systems described above. In a basic configuration, the computing device 501 includes at least one processing unit 502 and a system memory 504. Depending on the configuration and type of computing device 501, the system memory 504 may comprise volatile storage (e.g., random access memory), non-volatile storage (e.g., read-only memory), flash memory, or any combination of such memories. The system memory 504 may include an operating system 505 and one or more program modules 506 suitable for running software applications 550 (e.g., one or more the applications 112) and other applications.

The operating system 505 may be suitable for controlling the operation of the computing device 501. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 501 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including one or more of the stages of the methods and processes discussed herein, such the methods depicted in FIGS. 4A-C. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 501 on the single integrated circuit (chip). Examples of the present disclosure may also be practiced using other technologies capable of performing logical operations such as, for example, AND, OR, and NOT, including mechanical, optical, fluidic, and quantum technologies.

The computing device 501 may also have one or more input device(s) 512 such as a keyboard, a mouse, a pen, a sound input device, a touch input device, a camera, etc. The output device(s) 514 such as a display, speakers, a printer, etc. may also be included. The aforementioned devices are examples and others may be used. The computing device 501 may include one or more communication connections 516 allowing communications with other computing devices 518. Examples of suitable communication connections 516 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 504, the removable storage device 509, and the non-removable storage device 510 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 501. Any such computer readable media may be part of the computing device 501. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to a threading system that includes at least one processor; and memory storing instructions that when executed by the at least one processor, cause the system to perform operations. The operations include receiving, in a chat interface, an input query for a thread; receiving a response to the input query, wherein the response includes a link to at least one of a web page or an application; surfacing the response in the chat interface; receiving a selection of the link from the response; and in response to receiving the selection, storing data associated with the selected link as at least one of web-activity data or application-activity data for the thread.

In an example, the link is to a web page having web address, and the web address is stored as web-activity data. In still another example, the operations further include in response selection of the link, providing the web address to a web browser to cause the web browser to open the web page; and based on the web page remaining open for a threshold duration of time, storing the web address as web-activity data for the thread. In a further example, the web page is a first web page and the web address is a first web address, and the operations further comprise receiving a navigation indication from a web browser indicating a user-initiated navigation to a second web page having a second web page address. In yet another example, the operations further comprise storing the second web page address as part of the web-activity data for the thread. In still yet another example, the operations further include comparing content of the second web page with at least one of the input query or response; based on the comparison, determining that the content of the second web page is relevant to the thread; and in response to determining that the content of the second web page is relevant to the thread, storing the second web page address as part of the web-activity data for the thread.

In another example, the link is to an application having an application identifier, and the application identifier is stored as application-activity data. In a further example, the operations further include, in response selection of the link, providing the application identifier to an operating system to cause the application to launch. As a further example, the application is a first application and the application identifier is a first application identifier, and the operations further comprise receiving an application-launch indication indicating a user-initiated launch of a second application having a second application identifier. As yet another example, the operations further include storing the second application identifier as part of the application-activity data for the thread.

In another example, the operations further include comparing content of the second application with at least one of the input query or response; based on the comparison, determining that the content of the second application is relevant to the thread; and in response to determining that the content of the second application is relevant to the thread, storing the second application identifier as part of the application-activity data for the thread. In still another example, the operations further include subsequent to storing the data associated with the selected link, receiving a selection to resume the thread; in response to receiving the selection to resume the thread: populating the chat interface with the input query and the response; and performing at least one of: providing, to a web browser, the web-activity data for the thread to cause one or more web pages associated with web addresses in the web-activity data to be opened in the web browser; or providing, to an operating system, the application-activity data for the thread to cause one or more applications associated with application identifiers in the application-activity data to be launched.

In another aspect, the technology relates to a computer-implemented method for threading chats with application activity. The method includes receiving, in a chat interface, an input query for a thread; receiving a response to the input query, wherein the response includes a link to at least one of a web page or an application; surfacing the response in the chat interface; receiving a selection of the link from the response; and in response to receiving the selection, storing data associated with the selected link as at least one of web-activity data or application-activity data for the thread; subsequent to storing the data associated with the selected link, receiving a selection to resume the thread; and in response to receiving the selection to resume the thread: populating the chat interface with the input query and the response; and performing at least one of: providing, to a web browser, the web-activity data for the thread to cause one or more web pages associated with web addresses in the web-activity data to be opened in the web browser; or providing, to an operating system, the application-activity data for the thread to cause one or more applications associated with application identifiers in the application-activity data to be launched.

In an example, the link is to a web page having web address, and the web address is stored as web-activity data. In another example, the web-activity data is provided to the web browser to cause the web page to be opened. In still another example, the link is to an application having an application identifier, and the application identifier is stored as application-activity data. In yet another example, the application-activity data is provided to the operating system to cause the application to be launched.

In another aspect, the technology relates to a computer-implemented method for restoring context of a thread. The computer implemented method includes receiving a selection of a thread element to resume a prior thread; in response to receiving the selection of the thread element: populating a chat interface with one or more queries and responses of the prior thread; and providing web-activity data associated with the prior thread to a web browser to cause one or more websites to be opened by the web browser.

In an example, the prior thread has a thread title; the web-activity data includes multiple web addresses for multiple web pages; the multiple web pages are opened by the web browser as a tab group; and the thread title is used as a title for the tab group. In still another example, the method further includes receiving a new response in the thread including a new link to a new web address; receiving a selection of the new link; and providing the new web address to the web browser to cause the web browser to open the new web address in a new tab that is part of the tab group.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A threading system, comprising:
   at least one processor; and
   memory storing instructions that when executed by the at least one processor, cause the system to perform operations comprising:
   receiving, in a chat interface, an input query for a thread;
   receiving a response to the input query, wherein the response includes a link to at least one of a web page or an application;
   surfacing the response in the chat interface;
   receiving a selection of the link from the response;
   in response to receiving the selection, storing data associated with the selected link as at least one of web-activity data or application-activity data for the thread;
   subsequent to storing the data associated with the selected link, receiving a selection to resume the thread;
   in response to receiving the selection to resume the thread:
   populating the chat interface with the input query and the response; and
   performing at least one of:
   providing, to a web browser, the web-activity data for the thread to cause one or more web pages associated with web addresses in the web-activity data to be opened in the web browser; or
   providing, to an operating system, the application-activity data for the thread to cause one or more applications associated with application identifiers in the application-activity data to be launched.

2. The system of claim 1, wherein the link is to a web page having web address, and the web address is stored as web-activity data.

3. The system of claim 2, wherein the web page is a first web page and the web address is a first web address, and the operations further comprise receiving a navigation indication from a web browser indicating a user-initiated navigation to a second web page having a second web page address.

4. The system of claim 3, wherein the operations further comprise storing the second web page address as part of the web-activity data for the thread.

5. The system of claim 3, wherein the operations further comprise:
   comparing content of the second web page with at least one of the input query or response;
   based on the comparison, determining that the content of the second web page is relevant to the thread; and
   in response to determining that the content of the second web page is relevant to the thread, storing the second web page address as part of the web-activity data for the thread.

6. The system of claim 1, wherein the operations further comprise:
   in response selection of the link, providing the web address to a web browser to cause the web browser to open the web page; and
   based on the web page remaining open for a threshold duration of time, storing the web address as web-activity data for the thread.

7. The system of claim 1, wherein the link is to an application having an application identifier, and the application identifier is stored as application-activity data.

8. The system of claim 7, wherein the operations further comprise, in response selection of the link, providing the application identifier to an operating system to cause the application to launch.

9. The system of claim 7, wherein the application is a first application and the application identifier is a first application identifier, and the operations further comprise receiving an application-launch indication indicating a user-initiated launch of a second application having a second application identifier.

10. The system of claim 9, wherein the operations further comprise storing the second application identifier as part of the application-activity data for the thread.

11. The system of claim 9, wherein the operations further comprise:
    comparing content of the second application with at least one of the input query or response;
    based on the comparison, determining that the content of the second application is relevant to the thread; and
    in response to determining that the content of the second application is relevant to the thread, storing the second application identifier as part of the application-activity data for the thread.

12. A computer-implemented method for threading chats with application activity, the method comprising:
    receiving, in a chat interface, an input query for a thread;
    receiving a response to the input query, wherein the response includes a link to at least one of a web page or an application;
    surfacing the response in the chat interface;
    receiving a selection of the link from the response; and in response to receiving the selection, storing data associated with the selected link as at least one of web-activity data or application-activity data for the thread;

subsequent to storing the data associated with the selected link, receiving a selection to resume the thread; and in response to receiving the selection to resume the thread:

populating the chat interface with the input query and the response; and performing at least one of:

providing, to a web browser, the web-activity data for the thread to cause one or more web pages associated with web addresses in the web-activity data to be opened in the web browser; or providing, to an operating system, the application-activity data for the thread to cause one or more applications associated with application identifiers in the application-activity data to be launched.

13. The computer-implemented method of claim 12, wherein the link is to a web page having web address, and the web address is stored as web-activity data.

14. The computer-implemented method of claim 13, wherein the web-activity data is provided to the web browser to cause the web page to be opened.

15. The computer-implemented method of claim 12, wherein the link is to an application having an application identifier, and the application identifier is stored as application-activity data.

16. The computer-implemented method of claim 12, wherein the application-activity data is provided to the operating system to cause the application to be launched.

17. A non-transitory computer-readable medium storing instructions that, when executed by at least one processor, cause operations to be performed, the operations comprising:

receiving, in a chat interface, an input query for a thread;

receiving a response to the input query, wherein the response includes a link to at least one of a web page or an application;

surfacing the response in the chat interface;

receiving a selection of the link from the response; and in response to receiving the selection, storing data associated with the selected link as at least one of web-activity data or application-activity data for the thread;

subsequent to storing the data associated with the selected link, receiving a selection to resume the thread; and in response to receiving the selection to resume the thread:

populating the chat interface with the input query and the response; and performing at least one of:

providing, to a web browser, the web-activity data for the thread to cause one or more web pages associated with web addresses in the web-activity data to be opened in the web browser; or providing, to an operating system, the application-activity data for the thread to cause one or more applications associated with application identifiers in the application-activity data to be launched.

18. The computer-readable medium storing instructions of claim 17, wherein the link is to a web page having web address, and the web address is stored as web-activity data.

19. The computer-readable medium storing instructions of claim 18, wherein the web-activity data is provided to the web browser to cause the web page to be opened.

* * * * *